(12) United States Patent
Sade et al.

(10) Patent No.: US 10,862,737 B1
(45) Date of Patent: Dec. 8, 2020

(54) TECHNICAL PROCEDURE KNOWLEDGE SHARING SYSTEM FOR SERVICE ISSUE INVESTIGATION

(71) Applicant: EMC IP Holding Company LLC, Hopkinton, MA (US)

(72) Inventors: Maor Sade, Tel-Aviv (IL); Omer Sagi, Mazkeret Batya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 100 days.

(21) Appl. No.: 15/662,713

(22) Filed: Jul. 28, 2017

(51) Int. Cl.
| | |
|---|---|
| *G06N 20/00* | (2019.01) |
| *G06N 5/00* | (2006.01) |
| *G06F 16/335* | (2019.01) |
| *G06F 16/242* | (2019.01) |
| *G06F 16/332* | (2019.01) |

(Continued)

(52) U.S. Cl.
CPC .......... *H04L 41/0631* (2013.01); *G06F 3/048* (2013.01); *G06N 5/02* (2013.01); *G06N 20/00* (2019.01); *G06F 11/079* (2013.01); *G06F 11/34* (2013.01); *G06F 11/3476* (2013.01); *G06F 16/00* (2019.01); *G06F 16/2428* (2019.01); *G06F 16/335* (2019.01); *G06F 16/3328* (2019.01); *G06F 16/3349* (2019.01)

(58) Field of Classification Search
None
See application file for complete search history.

(56) References Cited

U.S. PATENT DOCUMENTS

| | | | | |
|---|---|---|---|---|
| 7,313,728 B2* | 12/2007 | Rhea | ................... | G06F 11/0727 714/25 |
| 8,326,868 B2* | 12/2012 | Kocsis | .................. | G06F 16/972 707/771 |

(Continued)

OTHER PUBLICATIONS

Loggly, "Loggly User Guide" 2016, available at https://web.archive.org/web/20160310154243/https://www.loggly.com/docs/about-loggly/ (Year: 2016).*

(Continued)

*Primary Examiner* — John C Kuan
(74) *Attorney, Agent, or Firm* — Ryan, Mason & Lewis, LLP

(57) ABSTRACT

A technical procedure knowledge sharing system is provided for service issue investigations. An exemplary apparatus comprises a processing platform including: a technical procedure specification graphical user interface for obtaining, from an investigator, a specification of a technical procedure comprising predefined log set filtering criteria and predefined feature extraction criteria for extracting predefined features from service issue investigation log set representations that satisfy the predefined log set filtering criteria; a processing device configured to apply the technical procedure to service issue investigation log set representations to identify the service issue investigation log set representations that satisfy the predefined log set filtering criteria; and extract the predefined features from the service issue investigation log set representations that satisfy the predefined log set filtering criteria; a technical procedure knowledge base for storing the technical procedure for use by additional investigators; and a visualization module for presenting information characterizing the extracted predefined features.

20 Claims, 7 Drawing Sheets

(51) Int. Cl.
*G06F 11/34* (2006.01)
*G06F 16/33* (2019.01)
*G06F 16/00* (2019.01)
*H04L 12/24* (2006.01)
*G06N 5/02* (2006.01)
*G06F 3/048* (2013.01)
*G06F 11/07* (2006.01)

(56) References Cited

U.S. PATENT DOCUMENTS

| | | | | |
|---|---|---|---|---|
| 8,977,909 | B2* | 3/2015 | Narayanan | G06F 11/0706 714/48 |
| 9,075,718 | B2* | 7/2015 | Hinterbichler | G06F 11/3656 |
| 10,027,689 | B1* | 7/2018 | Rathor | H04L 63/1416 |
| 2012/0143893 | A1* | 6/2012 | Abraham | G06F 11/3476 707/769 |
| 2013/0339801 | A1* | 12/2013 | Ramaiah | G06F 11/0709 714/45 |
| 2016/0203035 | A1* | 7/2016 | Tran | G06F 11/079 714/37 |
| 2017/0090736 | A1* | 3/2017 | King | G06F 3/04847 |
| 2018/0191903 | A1* | 7/2018 | Yokel | H04M 3/42068 |

OTHER PUBLICATIONS

Reidemeister et al., "Diagnosis of Recurrent Faults using Log Files" Proceedings of the 2009 Conference of the Center for Advanced Studies on Collaborative Research (Year: 2009).*

Oliner et al., "Advances and Challenges in Log Analysis" Communications of the ACM, vol. 55, No. 2, Feb. 2012 (Year: 2012).*

Loggly user guide—Grid View, available at https://web.archive.org/web/20160310153802/https://www.loggly.com/docs/grid-view/ (Year: 2016).*

Loggly user guide—Fields, available at https://web.archive.org/web/20160310152803/https://www.loggly.com/docs/filter-by-field/ (Year: 2016).*

PowerGREP, "Extracting and Collecting Information and Statistics from Logs, Archives, etc . . . " available at https://web.archive.org/web/20160428202403/https://www.powergrep.com/collect.html 2016 (Year: 2016).*

\* cited by examiner

TECHNICAL PROCEDURE KNOWLEDGE SHARING SYSTEM FOR SERVICE ISSUE INVESTIGATION

FIELD

The field relates generally to information processing systems, and more particularly to investigation of service issues in information processing systems using technical procedures.

BACKGROUND

Fast and effective customer support is important for customer satisfaction and loyalty in the Information Systems industry. When a customer reports a field issue (such as system bugs, a power outage and/or data unavailability), the vendor or service provider is required to solve the reported issue and to provide a root cause analysis of its occurrence. Providing a root cause analysis typically requires the expensive time of experienced engineers who investigate the issue by joining information from different sources (such as log events, configuration files, and/or unstructured customer text). Some of these investigations can last hours, or even days, in the case of an unfamiliar or complex issue.

Service issue tracking systems (such as JIRA Software™ or Bugzilla™) typically enable a textual query to locate items of interest (e.g., log content, system documentation, configuration properties and/or labels) as a part of an investigation of an issue. Generally, the textual queries, broadly known as "grep" commands, enable subjective assumptions about possible root causes to be confirmed or refuted. The chosen "grep" for a given service issue depends on a number of factors, such as the initial information about the service issue, the investigator's familiarity with past cases that are relevant to the given service issue, the investigator's access to knowledge sources and the investigator's ability to consult with peers or mentors. Retrieved results are typically provided as a list of log events that match the desired textual pattern, often potentially overwhelming an investigator through information overload.

A need remains for improved techniques for sharing technical procedures among service issue investigators.

SUMMARY

Illustrative embodiments of the present disclosure provide a technical procedure knowledge sharing system for service issue investigations. In one embodiment, an apparatus comprises a processing platform configured to implement a technical procedure knowledge base for service issue investigation; wherein the processing platform comprises: a technical procedure specification graphical user interface for obtaining a specification of a technical procedure from an investigator, wherein the technical procedure specification comprises one or more predefined log set filtering criteria and one or more predefined feature extraction criteria for extracting one or more predefined features from one or more service issue investigation log set representations that satisfy the one or more predefined log set filtering criteria; at least one processing device configured to (i) apply the technical procedure to a plurality of service issue investigation log set representations to identify the one or more service issue investigation log set representations that satisfy the one or more predefined log set filtering criteria; and (ii) extract the one or more predefined features from the one or more service issue investigation log set representations that satisfy the one or more predefined log set filtering criteria; a technical procedure knowledge base for storing the technical procedure for use by one or more additional investigators; and a visualization module for presenting information characterizing the extracted one or more predefined features in a user interface.

These and other illustrative embodiments described herein include, without limitation, apparatus, systems, methods and computer program products comprising processor-readable storage media.

DETAILED DESCRIPTION

Illustrative embodiments of the present disclosure will be described herein with reference to exemplary information processing systems and associated processing devices. It is to be appreciated, however, that embodiments of the disclosure are not restricted for use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

One or more embodiments of the disclosure provide a technical procedure knowledge sharing system for service issue investigations that allows technical investigation procedures to be shared among colleagues and other investigators. A technical procedure allows an investigator to specify the information that should be extracted from log data that satisfy predefined filtering constraints, such as log data having one or more predefined patterns or log data satisfying one or more predefined conditions. In addition, in one or more embodiments, the disclosed technical procedure knowledge sharing platform optionally allows investigators to predefine a content and/or format of an output dashboard for a given technical procedure to allow the result of the given technical procedure in to be presented in a predefined manner. In at least one embodiment, the disclosed technical procedure knowledge sharing platform also optionally allows investigators to predefine one or more constraints and/or permissions defining how a given technical procedure is shared.

Thus, in one or more embodiments, a technical procedure refers to a specific information extraction from log data that are filtered according to desired patterns or conditions. For example, an investigator may define a technical procedure that searches for log messages that start with the word "error" and have the word "panic" in them and, after filtering those messages, the defined technical procedure should extract event_id counts and distinct panic_ids from the remaining log messages. The information to be extracted from the remaining log messages can be specified, for example, using one or more regular expressions. In some embodiments, an investigator may configure a given technical procedure by completing an HTML (HyperText Markup Language) form, as discussed further below in conjunction with FIG. 4.

Figure 1:
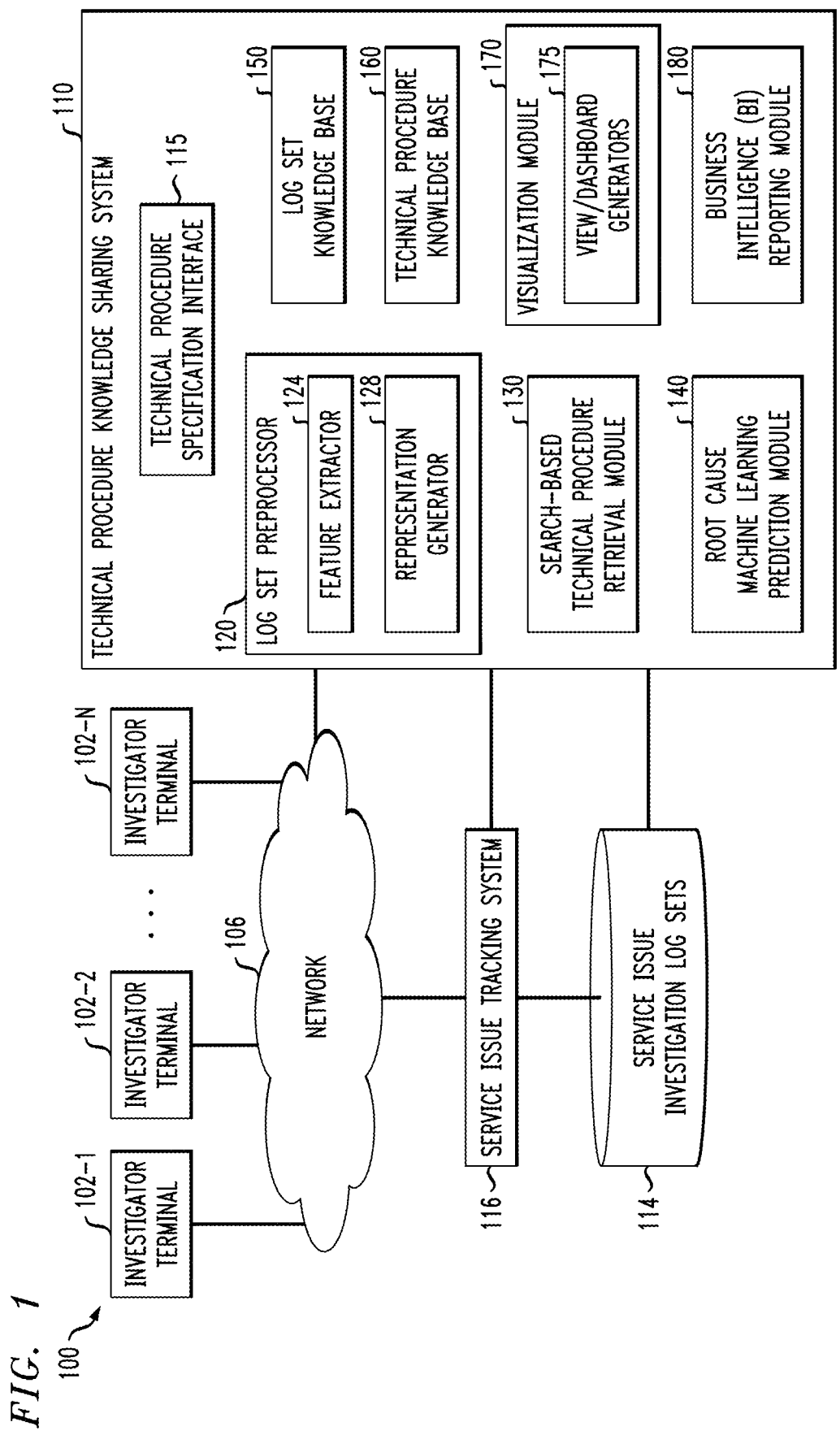
FIG. 1 is a block diagram of a technical procedure knowledge sharing system, according to one embodiment of the disclosure.

FIG. 1 shows an information processing system 100 configured in accordance with an illustrative embodiment of the present disclosure. The exemplary information processing system 100 is configured in at least one embodiment of the disclosure to provide a technical procedure knowledge sharing platform for service issue investigation. The information processing system 100 is assumed to be built on at least one processing platform and in this embodiment illustratively comprises a plurality of investigator terminals 102-1, 102-2, . . . 102-N and a technical procedure knowledge sharing system 110, all of which are coupled to, and communicate over, a network 106. The technical procedure knowledge sharing system 110 is advantageously configured for sharing technical investigation procedures among service issue investigators.

The technical procedure knowledge sharing system 110 is coupled to a service issue investigation log sets database 114. The service issue investigation log sets illustratively comprise information characterizing respective investigations of service issues as carried out by one or more service investigators (e.g., engineers) associated with investigator terminals 102. These service investigators illustratively comprise engineers, analysts, subject matter experts or other system users that are involved in investigations of service issues.

The service issue investigation log sets database 114 in the present embodiment is assumed to comprise service issue investigation log sets generated by a service issue tracking system 116, although other types of service issue investigation log sets can be used in other embodiments. The term "service issue investigation log set" as used herein is intended to be broadly construed so as to encompass, for example, logs of events associated with investigation of service issues, such as system bugs, power outage and/or data unavailability, or other issues arising in conjunction with a service provided to a customer. A given such service issue investigation log set in an illustrative embodiment may be viewed as comprising a "dossier" of information characterizing a service issue investigation conducted by a technician, engineer or other type of system user within the system 100.

It is to be appreciated that the service issue investigation log sets database 114 may comprise a combination of multiple separate databases, such as separate databases for storing log sets for different types of service issues or for different customers. Such multiple databases may be co-located within a given data center or other facility or geographically distributed over multiple distinct facilities. Numerous other combinations of multiple databases can be used in implementing at least portions of the service issue investigation log sets database 114. For example, a given information processing system in another embodiment can include multiple service issue tracking systems 116, each having its own database of service issue investigation log sets.

The service issue investigation log sets database 114 illustratively comprises one or more storage disks, storage arrays, electronic memories or other types of memory, in any combination. Although shown as separate from the technical procedure knowledge sharing system 110 in FIG. 1, the service issue investigation log sets database 114 in other embodiments can be at least partially incorporated within the technical procedure knowledge sharing system 110, or within one or more other system components.

The log sets stored in the service issue investigation log sets database 114 need not be in any particular format or formats, but generally comprise data logs characterizing investigations undertaken by one or more technicians or engineers relating to service issues arising with customers.

In the present embodiment, the technical procedure knowledge sharing system 110 and the service issue investigation log sets database 114 are both assumed to be associated with the service issue tracking system 116. For example, the storage of logs sets in, and the retrieval of logs sets from, the service issue investigation log sets database 114 in this embodiment can be controlled at least in part by the associated service issue tracking system 116. The technical procedure knowledge sharing system 110 can communicate directly with the service issue investigation log sets database 114 and the service issue tracking system 116, and additionally or alternatively can communicate with these and other system components via the network 106.

It is assumed in the present embodiment that the service issue tracking system 116 coordinates storage of service issue investigation log sets in the service issue investigation log sets database 114, as well as provisioning of portions of those log sets to the technical procedure knowledge sharing system 110, as needed for processing. It is also possible for the technical procedure knowledge sharing system 110 to provide data directly to, and retrieve data directly from, the service issue investigation log sets database 114. Examples of conventional service issue tracking systems that may be adapted for use in illustrative embodiments of the present disclosure include JIRA™, Gitlab™ and Bugzilla™.

At least portions of the data provided for storage in the service issue investigation log sets database 114 can come from one or more of the investigator terminals 102 via the service issue tracking system 116. Also, visualizations or other related output information can be delivered by the technical procedure knowledge sharing system 110 to one or more of the investigator terminals 102 over network 106. Thus, for example, a visualization or other type of machine learning system output can be provided to an application running on a desktop computer, tablet computer, laptop computer, mobile telephone or other type of investigator terminal.

The technical procedure knowledge sharing system 110 in the present embodiment is separated into a plurality of functional modules, illustratively including a technical procedure specification interface 115, a log set preprocessor 120, a search-based technical procedure retrieval module 130, a root cause machine learning prediction module 140, a log set knowledge base 150, a technical procedure knowledge base 160, a visualization module 170 and a business intelligence (BI) reporting module 180.

The log set preprocessor 120 is configured to extract features from each of a plurality of service issue investigation log sets and to generate representations for respective ones of the service issue investigation log sets based at least in part on the corresponding extracted features, as discussed in U.S. patent application Ser. No. 15/496,514, filed Apr. 25, 2017, entitled "Machine Learning-Based Recommendation System for Root Cause Analysis of Service Issued," incorporated by reference herein in its entirety. These functions are illustratively provided by a feature extractor 124 and a representation generator 128, respectively.

It is assumed that at least a subset of the service issue investigation log sets processed by the log set preprocessor 120 are generated by the service issue tracking system 116, although the technical procedure knowledge sharing system 110 can obtain log sets in other ways in one or more alternative embodiments of the disclosure. Also, it should be noted that in some embodiments, at least a portion of the technical procedure knowledge sharing system 110 may be implemented within the service issue tracking system 116, or vice-versa. The technical procedure knowledge sharing system 110 and the service issue tracking system 116 therefore need not be entirely separate elements as illustrated in the FIG. 1 embodiment.

In some embodiments, at least a given one of the service issue investigation log sets comprises serial log instances relating to at least one root cause analysis performed for a service issue of a customer. Such root cause analysis may be performed by the service issue tracking system 116 under the control of a software technician associated with one of the investigator terminals 102. As another example, a given one of the service issue investigation log sets may comprise a set of log files relating to a plurality of different events involving a particular service issue. The events can be from different parts of a system in which the service issue occurred, such as from different nodes in a cluster-based system. It is also possible that a given log set can comprise a set of log files obtained from "call home" log data submitted to the system 100 by a given customer with respect to a particular service issue. Accordingly, it should be apparent that a wide variety of different types of log sets can be used in illustrative embodiments.

The log set preprocessor 120 in the present embodiment is assumed to generate the representation of a given one of the service issue investigation log sets as a vector representation having entries corresponding to respective ones of the extracted features. Accordingly, particular features extracted by the feature extractor 124 are inserted into corresponding entry positions in a vector representation generated by the representation generator 128. The resulting representation may be viewed as providing a "fingerprint" for the corresponding log set.

The technical procedure knowledge sharing system 110 is advantageously data driven in that representations are generated automatically utilizing features extracted from the service issue investigation log sets themselves using the log set preprocessor 120. Such an arrangement allows relationships with other log sets to be determined in a particularly accurate and efficient manner.

The log set preprocessor 120, in generating the representation of a given one of the service issue investigation log sets, is illustratively further configured to augment the representation utilizing metadata obtained from the service issue tracking system 116. Such metadata in some embodiments comprises root cause information of the corresponding log set.

Although the log set preprocessor 120 in the embodiment of FIG. 1 is shown as being implemented within the technical procedure knowledge sharing system 110, in other embodiments, the log set preprocessor 120 can be implemented at least in part externally to the technical procedure knowledge sharing system 110. For example, log set preprocessor 120 can be implemented in a related system, such as the service issue tracking system 116.

The technical procedure knowledge sharing system 110 in the present embodiment further comprises a root cause machine learning prediction module 140. This module is illustratively configured to determine a root cause for the at least one additional service issue investigation log set based at least in part on root cause information associated with respective ones of the one or more of the representations previously stored in the log set knowledge base 150 that exhibit at least the specified relationship to the representation of the additional service issue investigation log set. For example, the root cause machine learning prediction module 140 can estimate a root cause for the additional service issue investigation log set as an average or other function of root cause values that were previously specified for the other log sets determined to be sufficiently related to the additional log set. In one or more embodiments, the root cause machine learning prediction module 140 is implemented using the techniques described in U.S. patent application Ser. No. 15/496,514, filed Apr. 25, 2017, entitled "Machine Learning-Based Recommendation System for Root Cause Analysis of Service Issued," incorporated by reference herein in its entirety.

Among other benefits, the technical procedure knowledge sharing techniques describes described herein, in one or more embodiments, substantially improve the information that is used by the root cause machine learning prediction module 140 for finding similarities between a current service issue and previously considered service issues. As described herein, it is hard to find the right features to be digested into a machine learning model that aims to find case similarities. The exemplary technical procedure knowledge sharing techniques allow an investigator to increase the assumptions that are being considered in a machine learning model by allowing investigators to define their own features that are derived from the output of the technical procedure. As a result, more assumptions can be tested when training the machine-learning model within the root cause machine learning prediction module 140.

In one or more embodiments, the root cause machine learning prediction module 140 is configured to retrieve, for a given additional log set obtained by the technical procedure knowledge sharing system 110, one or more previously processed log sets that exhibit characteristics related to that of the given additional log set. The additional log set may be submitted via the service issue tracking system 116 by a system user such as a technician associated with one of the investigator terminals 102.

By way of example, in conjunction with obtaining at least one additional service issue investigation log set, the technical procedure knowledge sharing system 110 is configured to generate a representation of the additional service issue investigation log set using the log set preprocessor 120, and to identify one or more of the representations previously stored in the log set knowledge base 150 that are determined by the root cause machine learning prediction module 140 to exhibit at least a specified relationship with the representation of the additional service issue investigation log set.

The log set knowledge base 150 is configured to store the log set representations generated by the log set preprocessor 120. The log set knowledge base 150 in some embodiments is implemented using an electronic memory or other high-speed memory of the technical procedure knowledge sharing system 110 or an associated processing platform.

The technical procedure knowledge sharing system 110 stores the representation of the additional service issue investigation log set in the log set knowledge base 150 for use in processing other service issue investigation log sets subsequently obtained by the technical procedure knowledge sharing system 110. As the log set knowledge base 150 in the present embodiment stores representations rather than the actual log sets, it can operate quickly on any submitted log sets by comparing representations of those log sets to previously stored representations of other log sets. The actual log sets corresponding to a given identified representation can be retrieved by the technical procedure knowledge sharing system 110 as needed and provided to one or more of the investigator terminals 102 over the network 106, possibly via the service issue tracking system 116.

The technical procedure knowledge base 160 is configured to store the representations of the technical procedures generated by investigators using the technical procedure specification interface 115, as discussed further below in conjunction with FIG. 4. In this manner, among other benefits, the introduction of investigator bias and the occurence of dead-end investigations can be reduced. The exemplary technical procedure knowledge sharing system 110 includes the technical procedure specification interface 115, such as a graphical user interface, that enables the investigation directions, typically represented as parsers and complex search rules, to be configured.

The produced technical procedures can be stored in the technical procedure knowledge base 160 and re-used by other investigators. In addition, results for a specific investigation path may be visualized in a designated dashboard by the visualization module 170, as discussed below. The technical procedure knowledge base 160 in some embodiments is implemented using an electronic memory or other high-speed memory of the technical procedure knowledge sharing system 110 or an associated processing platform. For example, in some embodiments, the technical procedure knowledge base 150 is implemented as a MongoDB database. The term "knowledge base" as used herein is intended to be broadly construed so as to encompass one or more databases or other storage arrangements comprising multiple representations each derived from at least a portion of one or more service issue investigation log sets.

The technical procedure knowledge base 160 allows support engineers and technical investigators to share their technical expertise with their colleagues and peers through the technical procedure knowledge base 160. Generally, technical investigators can multiply their benefit to the organization by sharing knowledge that would consequently enable resolving other service issues by other investigators. In addition, sharing technical procedure improves the toolset of investigators that will be exposed to new methods rather than simply point solutions.

In one or more embodiments, the exemplary technical procedure specification interface 115 provides the generator or producer of a new technical procedure with a structured initialization and editing of the technical procedure without requiring the use of more complicated communications (natural language, procedure scripts, etc.). Meanwhile, the consumer of the technical procedure can easily access the method from the technical procedure knowledge base 160 and use the shared technical procedure by applying it to given service issues without having to re-implement the procedure.

Thus, among other benefits, the exemplary technical procedure knowledge base 160 provides an organizational crowd-sourcing platform that enables technical insight sharing and convenient data analysis across log data investigators and across various interests, such as customer support and/or quality assurance teams. The technical procedure knowledge base 160, in one or more embodiments, encourages technical and interactive knowledge collaboration among investigating engineers and technical experts, and also eases investigation tasks for a given service issue, while reducing the cognitive overload involved in such tasks.

As shown in FIG. 1, the exemplary technical procedure knowledge sharing system 110 comprises a search-based technical procedure retrieval module 130 that allows investigators to retrieve technical procedures from the technical procedure knowledge base 160, for example, using keyword searching techniques. In one or more embodiments, the search-based technical procedure retrieval module 130 allows investigators to locate existing technical procedures using a text search to identify the technical procedures most relevant to the needs of the investigator.

The visualization module 170 comprises one or more view/dashboard generators 175. Information characterizing the one or more service issue investigation log sets corresponding to respective ones of the identified one or more representations is presented in a user interface under control of the one or more view/dashboard generators 175 of the visualization module 170.

In some embodiments, the technical procedure knowledge sharing system 110 is configured to receive user feedback regarding at least one of the identified one or more representations via the user interface and to optionally adjust one or more models within the technical procedure knowledge sharing system 110 responsive to the received user feedback. For example, the root cause machine learning prediction module 140 in some embodiments is configured to receive feedback from one of the service investigators or another system user regarding relationships among the one or more identified representations or their respective log sets and the additional log set.

Figure 6:
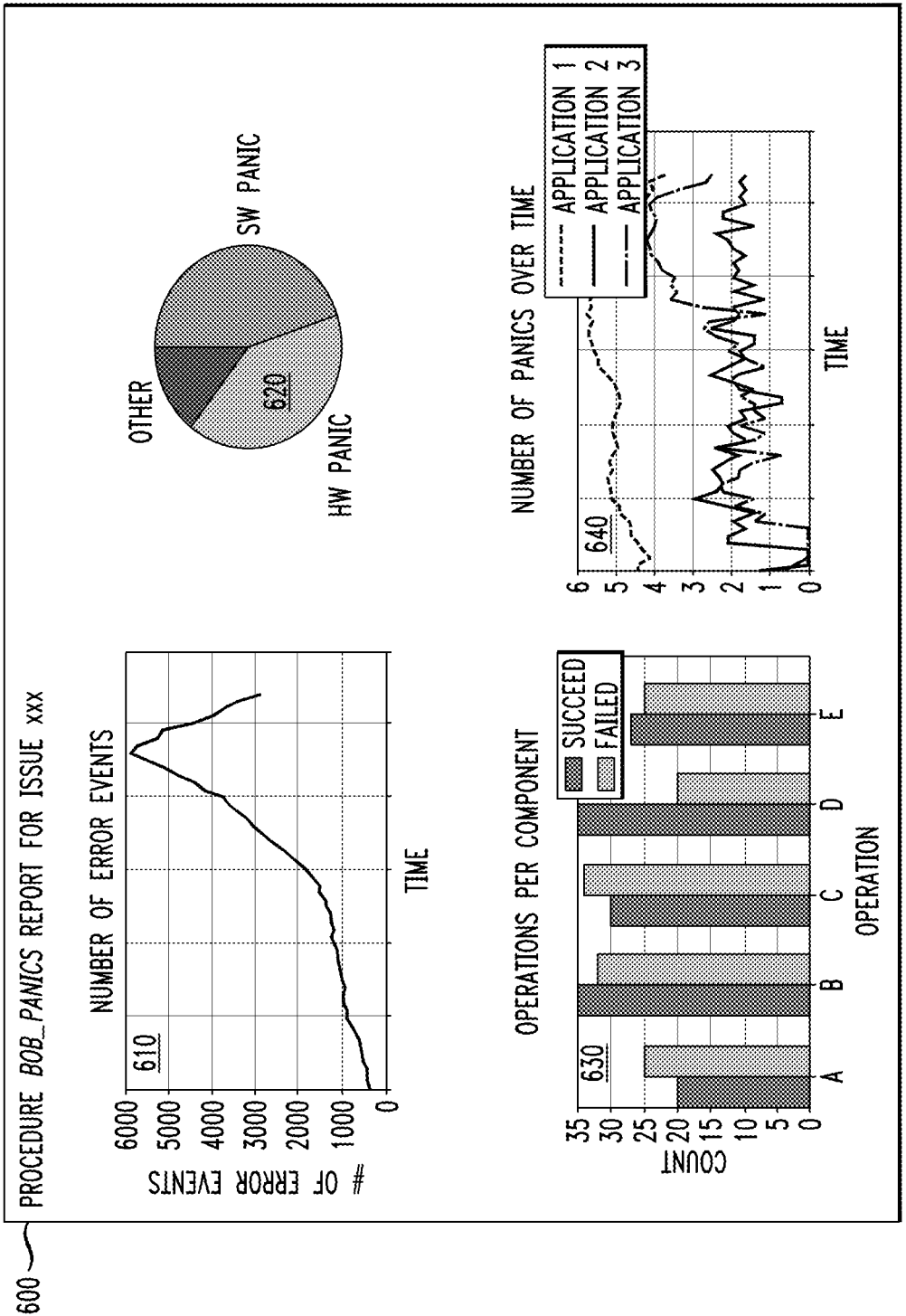
FIG. 6 illustrates a number of exemplary visualizations generated by one or more view/dashboard generators of the visualization module of FIG. 1, according to one embodiment of the disclosure.

Visualizations generated by the one or more view/dashboard generators 175 of the visualization module 170, as discussed further below in conjunction with FIG. 6, are presented to a system user possibly in conjunction with the one or more user interface displays. For example, a given one of the view/dashboard generators 175 can be configured to generate a number of error events view comprising a visualization of a number of error events over time. Such visualizations generated by the one or more view/dashboard generators 175 illustratively include multiple distinct icons or other links that when actuated allow the user to retrieve the respective actual log sets corresponding to the identified representations. A wide variety of additional or alternative view/dashboard generators 175 can be used in the visualization module 170 in other embodiments.

In one or more embodiments, discussed further below, the technical procedures generate a list of hash-maps. Each hash-map represents a log message that matches the conditions of the technical procedure and contains key-value pairs in accordance with the regular expression of the technical procedure. The output of a given technical procedure may be analyzed by the investigator when there are only a few messages that match the conditions. However, in some cases, an extraction of numerous messages by the technical procedure may overwhelm the investigator. The disclosed technical procedure knowledge sharing platform enables the user to define a designated dashboard for a given technical procedure. In this dashboard, the extracted information is visualized to users across different specified dimensions and desired outcomes, as discussed further below in conjunction with FIG. 6.

Exemplary dashboards contain different visualization objects (e.g. bar-plots, scatter-plots and pie charts) that may be relevant to the technical procedure at hand. For example, a given dashboard may present a report to the user that visualizes the results of a technical procedure for a given issue. The exemplary visualization module 170 allows a user to customize a designated dashboard for a given technical procedure for a service issue. Instead of manually reviewing numerous messages, a given investigator can view a user-friendly dashboard that has been customized by the given investigator or by another investigator or platform user.

In some embodiments, the visualization module 170 is part of a service issue analysis and visualization tool. Such a tool can incorporate other parts of the technical procedure knowledge sharing system 110. For example, it is possible to implement the technical procedure knowledge sharing system 110 within an analysis and visualization tool. The analysis and visualization tool can include a web-based user interface as its front end. An analytics database and associated processing logic can form a backend of the tool.

Although the visualization module 170 in the FIG. 1 embodiment is shown as being implemented within the technical procedure knowledge sharing system 110, in other embodiments this component, like the log set preprocessor 120 as previously indicated, can be implemented at least in part externally to the technical procedure knowledge sharing system 110, such as in the service issue tracking system 116 associated with the log sets database 114, or elsewhere in the system 100.

An output display generated by visualization module 170 utilizing the one or more view/dashboard generators 175 is illustratively presented on a display screen of one or more of the investigator terminals 102 of system 100, as discussed further below in conjunction with FIG. 6. As indicated previously, such a terminal may comprise a computer, mobile telephone or other type of processing device adapted for communication with the technical procedure knowledge sharing system 110 over the network 106.

The visualization module 170 in some embodiments operates in cooperation with the root cause machine learning prediction module 140 to support tuning functionality in the technical procedure knowledge sharing system 110 using the above-noted user interface displays. However, such tuning functionality need not be provided in other embodiments. For example, some embodiments can operate utilizing unsupervised machine learning functionality.

It is to be appreciated that the particular arrangement of system components illustrated in FIG. 1 is exemplary only, and that numerous other arrangements of components may be used in other embodiments. For example, in other embodiments, the technical procedure knowledge sharing functionality described herein as being associated with one or more of the log set preprocessor 120, log set knowledge base 150, root cause machine learning prediction module 140 and visualization module 170 may be implemented at least in part using additional or alternative components of the system 100.

The technical procedure knowledge sharing system 110, and possibly other related components of system 100 such as the log sets database 114, are assumed in the present embodiment to be implemented on a given processing platform using at least one processing device comprising a processor coupled to a memory. Examples of such processing platforms will be described in greater detail below in conjunction with FIGS. 7 and 8.

The one or more processing devices implementing the technical procedure knowledge sharing system 110, and possibly other components of system 100, may each further include a network interface that allows such components to communicate with one another over network 106. For example, a given such network interface illustratively comprises network interface circuitry that allows at least one of the modules 115, 120, 130, 140, 150, 160, 170, 180, to communicate over network 106 with other components of the system 100 such as investigator terminals 102, the log sets database 114 and service issue tracking system 116. Such network interface circuitry may comprise, for example, one or more conventional transceivers.

The network 106 may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

As a more particular example, some embodiments may implement at least a portion of the network 106 utilizing one or more high-speed local networks in which associated processing devices communicate with one another utilizing Peripheral Component Interconnect express (PCIe) cards of those devices, and networking protocols such as InfiniBand™, Gigabit Ethernet or Fibre Channel. Numerous alternative networking arrangements are possible in a given embodiment, as will be appreciated by those skilled in the art.

At least a portion of the technical procedure knowledge sharing system 110, and possibly other system components, may comprise software that is stored in a memory and executed by a processor of at least one processing device.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be further described with reference to the flow diagram of FIG. 2, which illustrates an exemplary process carried out by the system 100 in one embodiment. The process as shown includes steps 210 through 250. Steps 210 through 250 are assumed to be performed by the technical procedure knowledge sharing system 110, but one or more of these steps may be performed at least in part by, or in conjunction with, other system components in other embodiments. Moreover, functionality for knowledge sharing of service issue technical procedures as disclosed herein should not be viewed as being limited in any way to this particular illustrative arrangement of process steps. As indicated above, retrieval of log sets is assumed to encompass retrieval of corresponding log set representations from the log set knowledge base 150, as well as numerous other retrieval arrangements.

Figure 2:
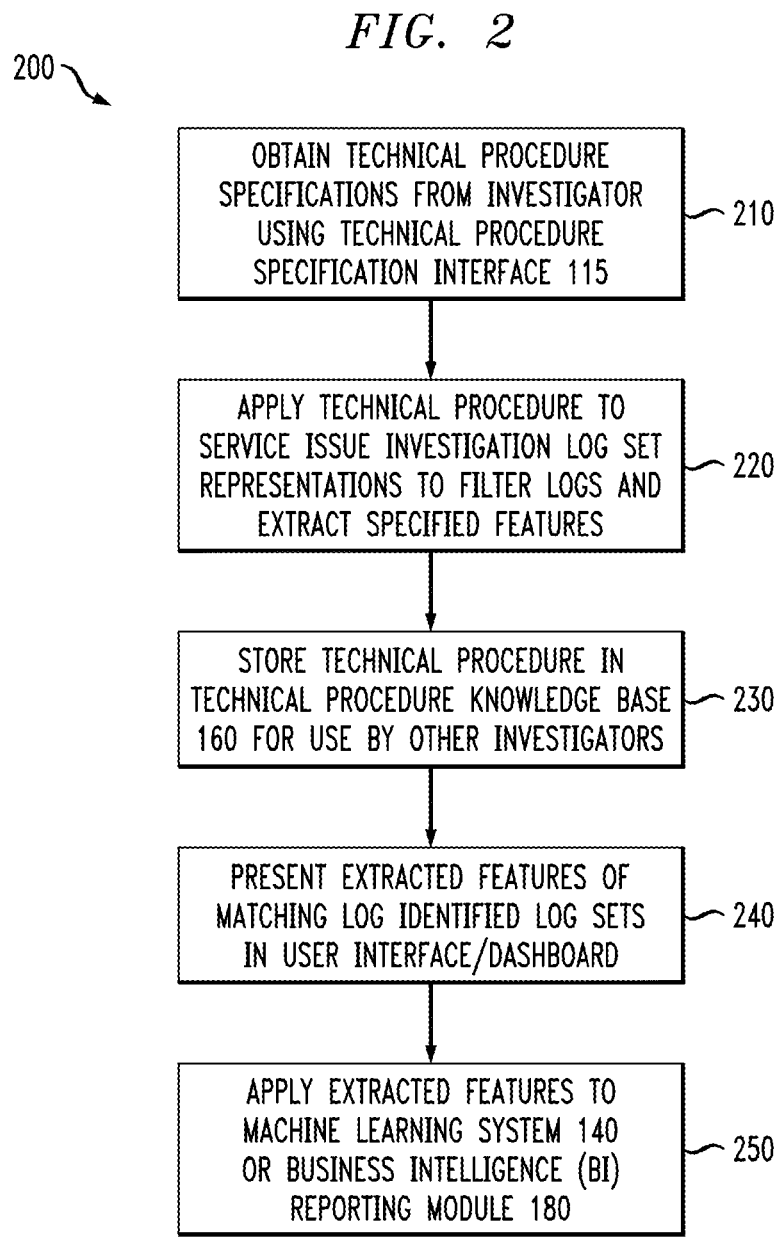
FIG. 2 is a flow chart illustrating an exemplary implementation of a technical procedure knowledge sharing process for service issue investigation, according to one embodiment of the disclosure.

FIG. 2 is a flow chart illustrating an exemplary implementation of a technical procedure knowledge sharing process 200 for service issue investigation, according to one embodiment of the disclosure. As shown in FIG. 2, the exemplary technical procedure knowledge sharing process 200 initially obtains technical procedure specifications from an investigator using the technical procedure specification interface 115, as discussed further below in conjunction with FIG. 4. As noted above, the technical procedure specification interface 115 allows a user to specify the filtering and extraction criteria associated with a given technical procedure being created (or modified).

During step 220, the exemplary technical procedure knowledge sharing process 200 applies the specified technical procedure to representations of the service issue investigation log sets 114, to filter the logs and extract the specified features, for example, in a key/value format or another format specified in the technical procedure.

The technical procedure knowledge sharing process 200 then stores the technical procedure in the technical procedure knowledge base 160 during step 230, for use by other investigators. Investigators can find existing technical procedure of interest in the technical procedure knowledge base 160, for example, using keyword or other text searches to identify one or more existing technical procedures that are most relevant to the current needs of the searching investigator.

Specified features extracted from the matching log identified log sets are presented during step 240 using the user interface and/or dashboard, as discussed further below in conjunction with FIG. 6. In addition, the extracted features are optionally applied to the root cause machine learning prediction module 140 and/or the business intelligence (BI) reporting module 180, during step 250.

Figure 3:
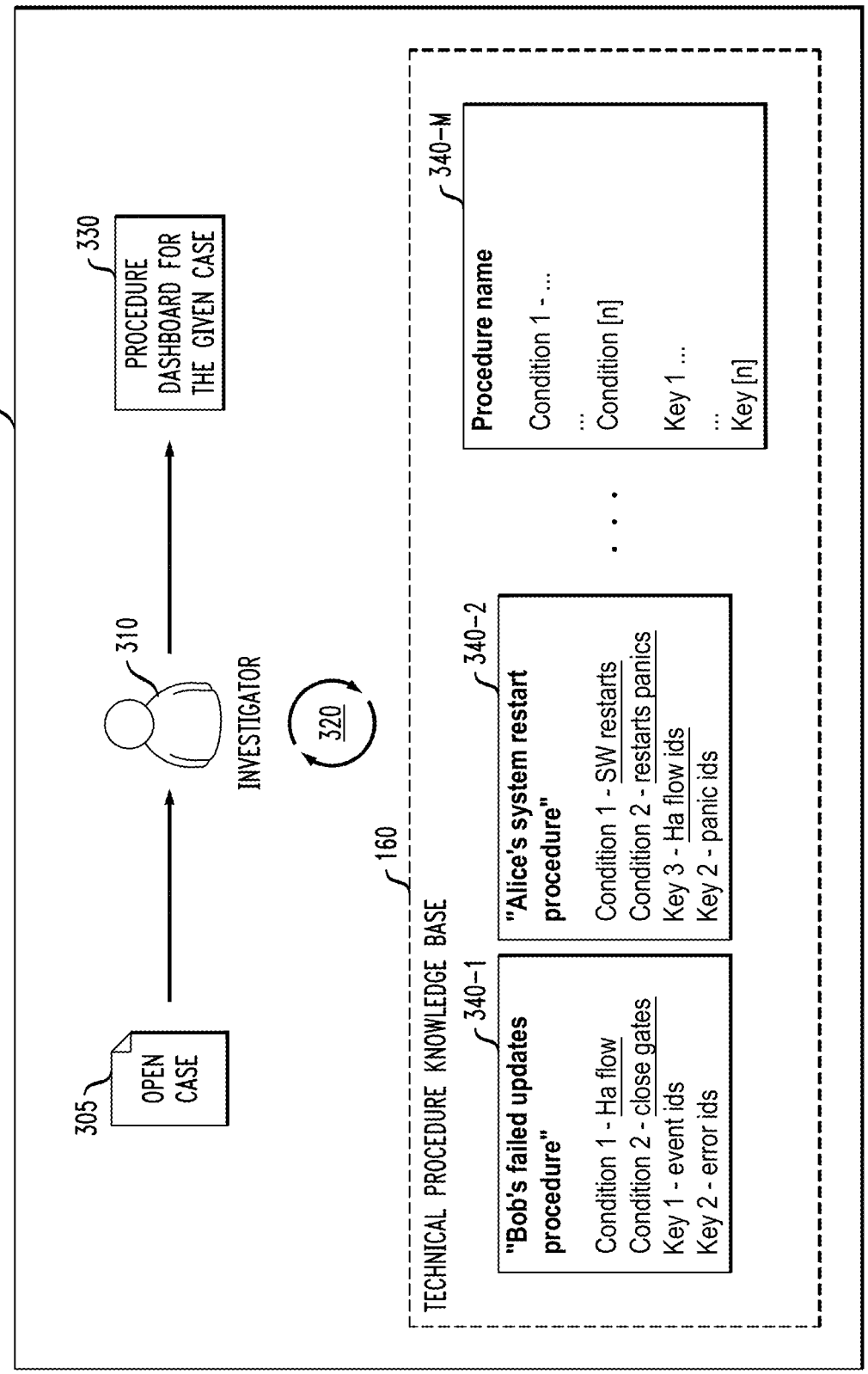
FIG. 3 illustrates a number of aspects of the technical procedure knowledge sharing process of FIG. 2 in further detail, according to one embodiment of the disclosure.

FIG. 3 illustrates a number of aspects of the technical procedure knowledge sharing process 200 of FIG. 2 in further detail, according to one embodiment of the disclosure. As shown in FIG. 3, an investigator 310 gets a new incoming service issue, for example, in the form of an open case 305 comprising a log entry. According to available preliminary information (e.g., a customer description and/or a last error message), the investigator 310 can obtain technical procedures that are believed to be relevant from the technical procedure knowledge base 160. The investigator 310 can identify the relevant technical procedures, for example, by manually reading textual descriptions of each existing technical procedure in the technical procedure knowledge base 160, or by employing a keyword search using the search-based technical procedure retrieval module 130.

The investigator 310 can selectively apply the selected technical procedures to the open case 305, for example, using an iterative procedure 320, and the output of the technical procedure can be visualized, by one or more view/dashboard generators 175, with a procedure dashboard 330 for the given case, specified as part of the selected technical procedure. The exemplary technical procedure knowledge base 160 shown in FIG. 3 comprises a number of illustrative technical procedures 340-1 through 340-M.

Figure 4:
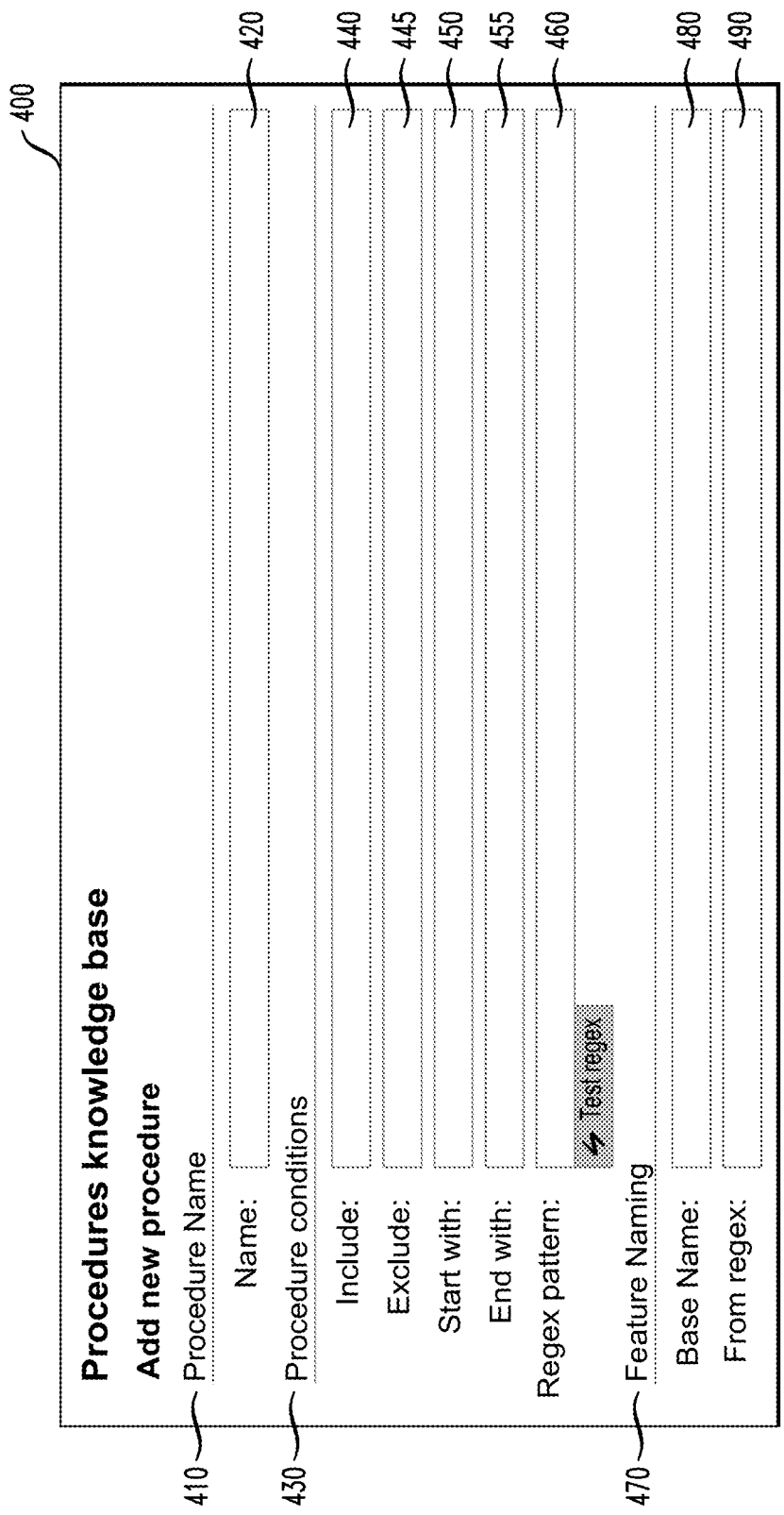
FIG. 4 illustrates an exemplary implementation of the technical procedure specification interface of FIG. 1, according to one embodiment of the disclosure.

FIG. 4 illustrates an exemplary implementation 400 of the technical procedure specification interface 115 of FIG. 1, according to one embodiment of the disclosure. In the exemplary embodiment of FIG. 4, the technical procedure specification interface 115 is implemented using an HTML form that enables an investigator 310 to initialize a new investigation technical procedure. As noted above, a technical procedure predefines information to be extracted from log data that satisfy predefined filtering constraints, such as desired patterns or conditions of the log data.

The exemplary technical procedure specification interface implementation 400 comprises a first section 410 for specifying a name for the procedure; a second section 430 for specifying conditions of the technical procedure and a third section 470 for specifying names for feature extracted using the technical procedure.

As shown in FIG. 4, the exemplary first section 410, for specifying a name for the procedure, includes a field 420 for specifying the technical procedure name (the name is suggested to be indicative of a purpose of the technical procedure, such as "HW_severe_failures"). In addition, the exemplary second section 430, for specifying conditions of the technical procedure (e.g., the textual rules that determine which messages will be extracted from the log file), includes a field 440 for optionally specifying one or more patterns or text that the log data must include (e.g., extract messages that include the text "hardware"); a field 445 for optionally specifying one or more patterns or text that the log data must not include (e.g., extract messages that do not include the text "network"); a field 450 for optionally specifying conditions that the log data must start with (e.g., extract messages that start with the text "critical"); a field 455 for optionally specifying conditions that the log data must end with (e.g., extract messages that end with the text "error"); and a field 460 for specifying a regular expression pattern defining one or more additional or alternative conditions that the log data must satisfy.

As shown in FIG. 4, the exemplary third section 470, for specifying the features that should be extracted from the messages filtered using the technical procedure, includes a base name field 480 and an (extract) from regular expression 490. Information is extracted by determining a pattern through the regular expression specified in field 490. For example, a regular expression from the sales domain may extract event time and customer name from a given sales log. Once the investigator creates a new regular expression, the regular expression can be re-applied for every message that matches the desired conditions. In one or more embodiments, the base name option 480 provides the capability of relating the extracted information to a feature of a machine learning model, such as models that aim to find similarities.

Once a new technical procedure has been specified using the exemplary technical procedure specification interface implementation 400 of FIG. 4, the created procedure can be used by the investigator, as well as whoever has appropriate privileges and access to the technical procedure knowledge base 160 for extracting messages that may be relevant to an open issue.

In one variation (not shown in FIG. 4), the exemplary technical procedure specification interface 115 of FIG. 1 optionally allows a user to specify one or more parameters of the dashboard that displays the results of a given technical procedure. In this manner, the investigator can present the output of the given technical procedure in a predefined manner.

In another variation (not shown in FIG. 4), the exemplary technical procedure specification interface 115 of FIG. 1 optionally allows a user to specify one or more sharing constraints and/or permissions that define the public and/or internal sharing of the new technical procedure.

Figure 5:
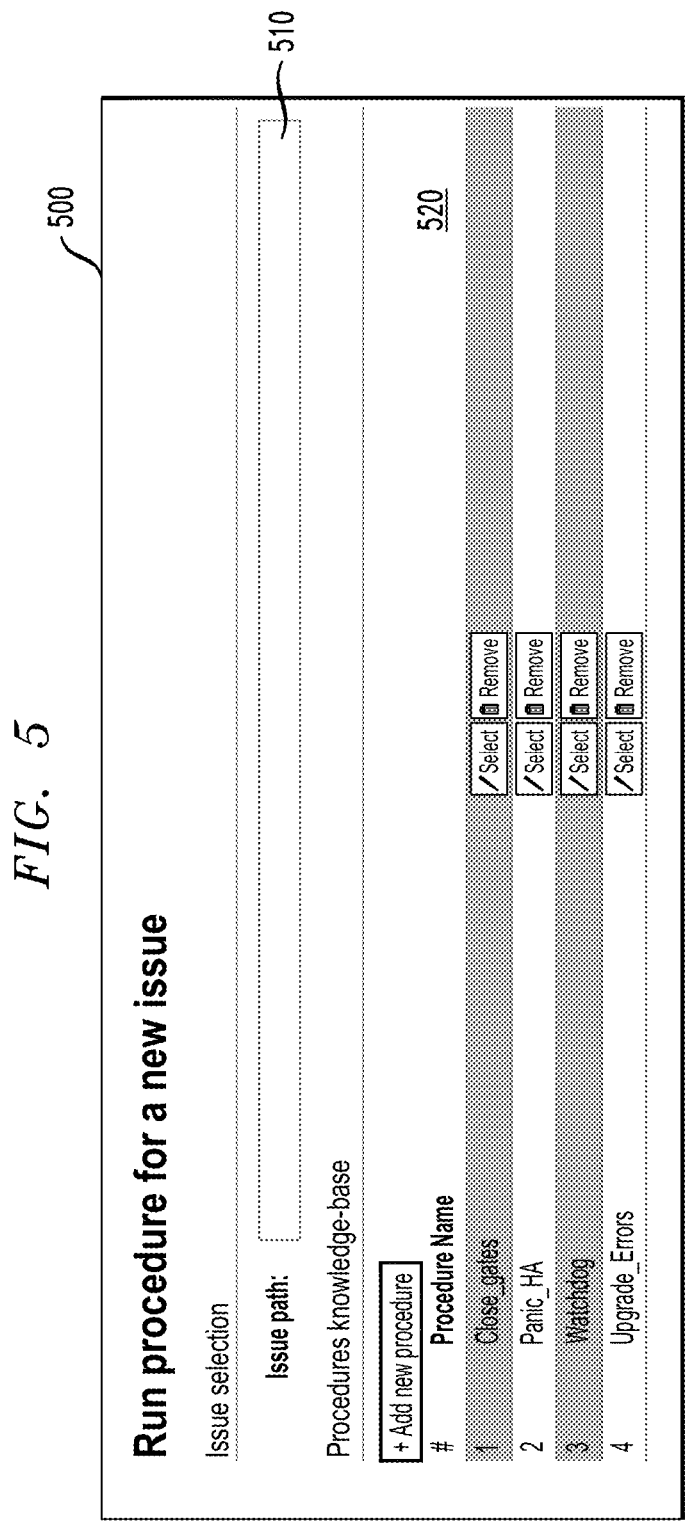
FIG. 5 illustrates an exemplary user interface for selecting a technical procedure from the technical procedure knowledge base of FIG. 1 for a new service issue, according to one embodiment of the disclosure.

FIG. 5 illustrates an exemplary user interface 500 for selecting a technical procedure from the technical procedure knowledge base 160 for a new open case 305, according to one embodiment of the disclosure. In the exemplary embodiment of FIG. 5, a user can specify a path in field 510 to identify where the new open case 305 (e.g., comprising log files) related to the service issue under investigation can be found. In addition, the exemplary user interface 500 provides a list 520 of the existing technical procedures for selection of a particular technical procedure to apply to the new open case 305, from the technical procedure knowledge base 160. In one or more embodiments, by selecting a technical procedure and inserting the path for the relevant log files, the user executes the technical procedure.

FIG. 6 illustrates a number of exemplary visualizations 600 generated by one or more view/dashboard generators 175 of the visualization module 170 of FIG. 1, according to one embodiment of the disclosure. The exemplary visualizations 600 of FIG. 6 are illustrated for a technical procedure "Bob_panics" for a given service issue ("xxx"). As noted above, in one or more embodiments, the disclosed technical procedure knowledge sharing system 110 optionally allows investigators to predefine a content and/or format of an output dashboard for a given technical procedure to allow the result of the given technical procedure to be presented in a predefined manner.

As shown in the example of FIG. 6, a given view/dashboard generator 175 can be configured to generate a number of error events view 610 comprising a visualization of a number of error events over time. Such visualizations generated by the view/dashboard generator 175 illustratively include multiple distinct icons or other links that when actuated allow the user to retrieve the respective actual log sets corresponding to the identified representations. A wide variety of additional or alternative view/dashboard generators 175 can be used in the visualization module 170 in other embodiments, as would be apparent to a person of ordinary skill in the art.

In addition, a view 620 optionally presents a pie chart indicating a relative percentage of log files being attributed to a hardware panic issue, software panic issue, or "other issues." A view 630 optionally presents a bar chart indicating a number of successful and failed operations per component. A view 640 optionally presents a visualization of a number of panic events over time, for three exemplary applications.

In one or more embodiments, the technical procedures generate a list of hash-maps. Each hash-map represents a log message that matches the conditions of the technical procedure and contains key-value pairs extracted from the matching log message in accordance with the regular expression of the technical procedure. The output of a given technical procedure may be analyzed by the investigator when there are only a few messages that match the conditions. However, in some cases, an extraction of numerous messages by the technical procedure may overwhelm the investigator. As noted above, the disclosed technical procedure knowledge sharing platform enables the user to define a designated dashboard for a given technical procedure. In this designated dashboard, the extracted information is visualized to users across different specified dimensions and desired outcomes, such as the exemplary visualizations shown in FIG. 6.

Exemplary dashboards defined by investigators comprise different visualization objects (e.g., bar plots, scatter plots and pie charts) that may be relevant to the technical procedure at hand. For example, a given dashboard may present a report to the user that visualizes the results of a technical procedure for a given issue. The exemplary visualization module 170 allows a user to customize a designated dashboard for a given technical procedure for a service issue. Instead of manually reviewing numerous messages, a given investigator can view a user friendly dashboard that has been customized by the given investigator or by another investigator or platform user.

Among other benefits, the exemplary technical procedure knowledge base 160 provides an organizational crowd sourcing platform that enables technical insight sharing and convenient data analysis across log data investigators and across various interests, such as customer support and/or quality assurance teams. Users of a given shared technical procedure can optionally provide feedback regarding the shared technical procedure, and/or rate or rank the shared technical procedure. The technical procedure knowledge base 160, in one or more embodiments, encourages technical and interactive knowledge collaboration among investigating engineers and technical experts, and also eases investigation tasks for a given service issue, while reducing the cognitive overload involved in such tasks.

In one exemplary implementation, the disclosed technical procedure knowledge sharing system 110 is optionally integrated within XtremIO™ service issue investigation tools, commercially available from Dell EMC Corp. of Hopkinton, Mass., to resolve internal and external service issues by analyzing log data.

Various types of user interfaces comprising functionality for provision of user feedback can be configured under the control of the view/dashboard generators 175 of the visualization module 170 of the technical procedure knowledge sharing system 110. For example, one possible user interface can present links to the one or more service issue investigation log sets corresponding to the respective one or more identified representations. Actuation of a given such link causes additional information relating to the selected service issue investigation log set to be retrieved and presented via the user interface. A control button or other selection mechanism can be provided to allow the user to provide a confidence level or other type of feedback for each of the identified representations or their respective corresponding log sets. For example, the confidence level in some embodiments is binary in that the user can select only "related" or "not related" although other arrangements of multiple selectable confidence levels can be used in other embodiments.

Numerous other types of user interfaces can be used in other embodiments. Such user interfaces are assumed to utilize one or more visualizations generated by view/dashboard generators 175 of the visualization module 170. Such visualizations can include graphs or other displays, as well as drop-down menus, activatable icons or other control buttons configured to facilitate user navigation through the identified one or more representations or the corresponding service issue investigation log sets.

Steps 210 through 250 of the FIG. 2 process can be repeated periodically or as needed to process additional service issue investigation log sets. The process illustratively provides a user with an accurate and efficient automated mechanism for configuring, applying and sharing technical procedures.

The particular processing operations and other system functionality described in conjunction with FIGS. 2 through 6 are presented by way of illustrative example only, and should not be construed as limiting the scope of the disclosure in any way. Alternative embodiments can use other types of processing operations for implementing technical procedure knowledge sharing. For example, the ordering of the process steps may be varied in other embodiments, or certain steps may be performed concurrently with one another rather than serially.

It is to be appreciated that functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

In addition, as noted above, the configuration of information processing system 100 is exemplary only, and numerous other system configurations can be used in implementing a machine learning system as disclosed herein.

The illustrative embodiments provide a number of significant advantages relative to conventional arrangements. For example, one or more of these embodiments avoid the need for inefficient and subjective manual processing of service issue investigation log sets by service investigators. Instead, the exemplary technical procedure knowledge sharing system allows an investigator to efficiently configure, apply and share technical procedures to resolve service issues. Such arrangements facilitate investigation of service issues arising in conjunction with, for example, deployment of new or upgraded software, leading to accelerated service issue and associated reductions in cost and complexity.

Some embodiments provide a proactive approach that builds a data driven knowledge base of log set representations and technical procedures so as to facilitate improved issue detection and resolution in conjunction with service issues. Such an approach significantly shortens the service issue investigation process as it allows previously configured technical procedures to be re-used and shared among investigators.

In addition, different investigators may have different semantic interpretations for the same or very similar customer issue. For example, assume that a first user titles a customer issue as "data unavailability," while a second user subsequently encounters the same or very similar issue, but views the problem as a "power outage." With the existing tracking systems, the textual conclusions of the first user will not benefit the second user at all.

One or more of the illustrative embodiments not only result in reduced service issue investigation time, but also avoid subjectively biased investigations while providing more reliable service issue tracking based on highly accurate representations reflecting the actual state of the service issues as investigated in the field.

These and other embodiments can avoid situations in which, for example, different service investigators utilize different terminology or naming conventions to describe related issues. Also, problems arising from poor data quality such as misspellings or ambiguities in the log sets are avoided by the technical procedure knowledge sharing functionality implemented in illustrative embodiments herein.

It is to be appreciated that the foregoing advantages are illustrative of advantages provided in certain embodiments, and need not be present in other embodiments.

In these and other embodiments, compute services can be offered to cloud infrastructure tenants or other system users as a PaaS offering, although numerous alternative arrangements are possible.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as technical procedure knowledge sharing system 110, or portions thereof, are illustratively implemented for use by tenants of such a multi-tenant environment.

As mentioned previously, cloud infrastructure as disclosed herein can include cloud-based systems such as AWS™, GCP™ and Microsoft Azure®. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
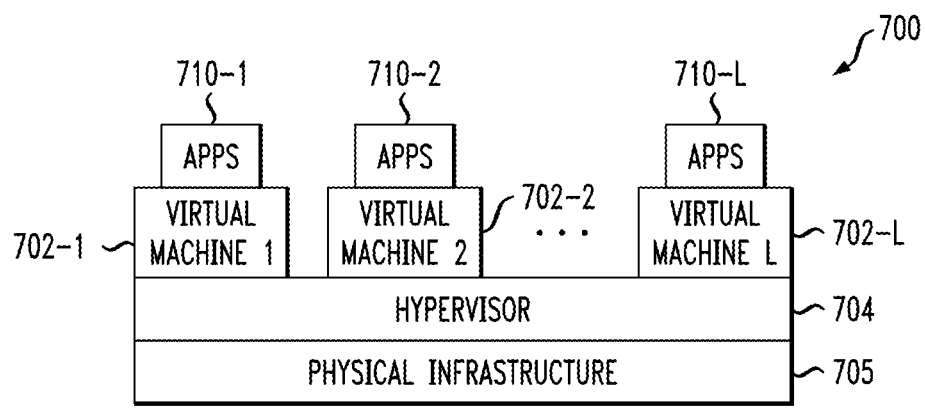
FIGS. 7 and 8 show examples of processing platforms that may be utilized to implement at least a portion of the information processing system of FIG. 1.
Figure 8:
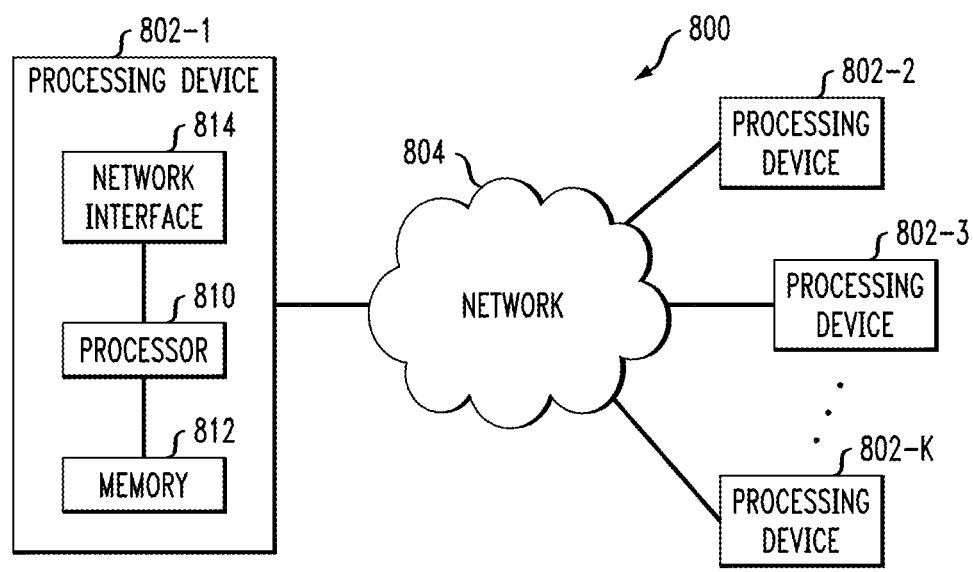

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of technical procedure knowledge sharing system 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compute services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a specification of a technical procedure from an investigator using a graphical user interface, wherein said technical procedure specification comprises: a user-defined technical procedure name, one or more predefined log set filtering criteria, one or more predefined feature extraction criteria one or more feature names each of which corresponds to at least a respective one of the one or more predefined feature extraction criteria;
in response to the obtaining the specification of the technical procedure, applying the technical procedure to a plurality of service issue investigation log sets, wherein applying the technical procedure comprises (i) identifying one or more log messages in said plurality of service issue investigation log sets that satisfy said one or more predefined log set filtering criteria, (ii) extracting information from said identified one or more log messages in said plurality of service issue investigation log sets, the information satisfying said one or more predefined feature extraction criteria, and (iii) correlating at least a portion of said extracted information to one or more user-defined features based on said one or more feature names, said one or more user-defined features to be considered by a root cause machine learning prediction tool;
generating a log set service representation for each of said plurality of service issue investigation log sets based at least in part on the extracted information, wherein a given log set service representation comprises a vector representation comprising entries corresponding to respective ones of said one or more user-defined features;
applying said generated log set service representations to said root cause machine learning prediction tool, wherein said root cause machine learning prediction tool identifies one or more log set service representations of previously investigated service issues that are related to a log set service representation of an additional service issue based on pairwise probabilities indicating whether said additional service issue is related to at least a subset of said previously investigated service issues;
storing said technical procedure in a technical procedure knowledge base based on the user-defined technical procedure name for use by one or more additional investigators; and
presenting information characterizing results of applying the technical procedure in said graphical user interface.

2. The method of claim 1, further comprising the step of applying said extracted information that is correlated to said one or more user-defined features to a business intelligence reporting module.

3. The method of claim 1, further comprising the step of determining a root cause for the additional service issue based at least in part on root cause information associated with respective ones of the one or more log set service representations of previously investigated service issues that satisfy a predefined criteria for being related to the additional service issue.

4. The method of claim 1, further comprising the step of providing a search interface for retrieval of one or more technical procedures from said technical procedure knowledge base by said one or more additional investigators.

5. The method of claim 1, wherein said step of extracting said information from said identified one or more log messages in said plurality of service issue investigation log sets comprises extracting said information in a key/value format.

6. The method of claim 1, wherein said specification of said technical procedure further comprises a specification of one or more of a content and a format of said information characterizing results of applying the technical procedure presented in said user interface.

7. The method of claim 1, wherein said specification of said technical procedure further comprises one or more permissions defining a sharing of said technical procedure.

8. The method of claim 1, wherein applying the technical procedure to a plurality of service issue investigation log sets comprises:
generating a list of hash-maps comprising results from applying said technical procedure, wherein each of the hash-maps (i) represents a given one of the identified one or more log messages, and (ii) comprises key-value pairs corresponding to said extracted information corresponding to said one or more user-defined features.

9. The method of claim 1, further comprising:
defining one or more of a content and a format of an output dashboard for presenting results of the given technical procedure in a predefined manner.

10. A computer program product, comprising a non-transitory machine-readable storage medium having encoded therein executable code of one or more software programs, wherein the one or more software programs when executed by at least one processing device perform the following steps:
obtaining a specification of a technical procedure from an investigator using a graphical user interface, wherein said technical procedure specification comprises: a user-defined technical procedure name, one or more predefined log set filtering criteria, one or more predefined feature extraction criteria, and one or more feature names each of which corresponds to at least a respective one of the one or more predefined feature extraction criteria;
in response to the obtaining the specification of the technical procedure, applying the technical procedure to a plurality of service issue investigation log sets, wherein applying the technical procedure comprises (i) identifying one or more log messages in said plurality of service issue investigation log sets that satisfy said one or more predefined log set filtering criteria, (ii) extracting information from said identified one or more log messages in said plurality of service issue investigation log sets, the information satisfying said one or more predefined feature extraction criteria, and (iii) correlating at least a portion of said extracted information to one or more user-defined features based on said one or more feature names, said one or more user-defined features to be considered by a root cause machine learning prediction tool;
generating a log set service representation for each of said plurality of service issue investigation log sets based at least in part on the extracted information, wherein a given log set service representation comprises a vector representation comprising entries corresponding to respective ones of said one or more user-defined features;

applying said generated log set service representations to said root cause machine learning prediction tool, wherein said root cause machine learning prediction tool identifies one or more log set service representations of previously investigated service issues that are related to a log set service representation of an additional service issue based on pairwise probabilities indicating whether said additional service issue is related to at least a subset of said previously investigated service issues;

storing said technical procedure in a technical procedure knowledge base based on the user-defined technical procedure name for use by one or more additional investigators; and presenting information characterizing results of applying the technical procedure in said graphical user interface.

11. The computer program product of claim 10, further comprising the step of providing a search interface for retrieval of one or more technical procedures from said technical procedure knowledge base by said one or more additional investigators.

12. The computer program product of claim 10, wherein said specification of said technical procedure further comprises a specification of one or more of a content and a format of said information characterizing results of applying the technical procedure presented in said user interface.

13. The computer program product of claim 10, wherein said specification of said technical procedure further comprises one or more permissions defining a sharing of said technical procedure.

14. An apparatus, comprising:
a processing platform configured to implement a technical procedure knowledge base for service issue investigation;
wherein the processing platform comprises at least one processing device comprising a processor coupled to a memory, the at least one processing device being configured:
to obtain a specification of a technical procedure from an investigator using a graphical user interface, wherein said technical procedure specification comprises: a user-defined technical procedure name, one or more predefined log set filtering criteria, one or more predefined feature extraction criteria, and one or more feature names each of which corresponds to at least a respective one of the one or more predefined feature extraction criteria;
in response to the obtaining the specification of the technical procedure, to apply the technical procedure to a plurality of service issue investigation log sets, wherein applying the technical procedure comprises (i) identifying one or more log messages in said plurality of service issue investigation log sets that satisfy said one or more predefined log set filtering criteria, (ii) extracting information from said identified one or more log messages in said plurality of service issue investigation log sets, the information satisfying said one or more predefined feature extraction criteria, and (iii) correlating at least a portion of said extracted information to one or more user-defined features based on said one or more feature names, said one or more user-defined features to be considered by a root cause machine learning prediction tool;
to generate a log set service representation for each of said plurality of service issue investigation log sets based at least in part on the extracted information, wherein a given log set service representation comprises a vector representation comprising entries corresponding to respective ones of said one or more user-defined features;
to apply said generated log set service representations to said root cause machine learning prediction tool, wherein said root cause machine learning prediction tool identifies one or more log set service representations of previously investigated service issues that are related to a log set representation of an additional service issue based on pairwise probabilities indicating whether said additional service issue is related to at least a subset of said previously investigated service issues;
to store said technical procedure in said technical procedure knowledge base based on the user-defined technical procedure name for use by one or more additional investigators; and
to present information characterizing results of applying the technical procedure in said graphical user interface.

15. The apparatus of claim 14, wherein the at least one processing device is further configured to apply said extracted information that is correlated to said one or more user-defined features to a business intelligence reporting module.

16. The apparatus of claim 14, wherein the at least one processing device is further configured to determine a root cause for the additional service issue based at least in part on root cause information associated with respective ones of the one or more log set service representations of previously investigated service issues that satisfy a predefined criteria for being related to the additional service issue.

17. The apparatus of claim 14, wherein the at least one processing device is further configured to retrieve one or more technical procedures from said technical procedure knowledge base by said one or more additional investigators.

18. The apparatus of claim 14, wherein said extraction of said information from said identified one or more log messages in said plurality of service issue investigation log sets comprises extracting said information in a key/value format.

19. The apparatus of claim 14, wherein said specification of said technical procedure further comprises a specification of one or more of a content and a format of said information characterizing results of applying the technical procedure presented in said user interface.

20. The apparatus of claim 14, wherein said specification of said technical procedure further comprises one or more permissions defining a sharing of said technical procedure.

\* \* \* \* \*